United States Patent
MacGeorge et al.

[11] Patent Number: 5,865,103
[45] Date of Patent: Feb. 2, 1999

[54] OPEN FRYER GRIDDLE

[75] Inventors: Gregory D. MacGeorge; Jack P. Hill, both of Louisville, Ky.

[73] Assignee: KFC Corporation, Louisville, Ky.

[21] Appl. No.: 821,882

[22] Filed: Mar. 21, 1997

[51] Int. Cl.[6] .................................................. A47J 37/12
[52] U.S. Cl. ............................................... 99/413; 99/422
[58] Field of Search .............................. 99/410, 413, 422, 99/411, 412, 414; 126/390

[56] References Cited

U.S. PATENT DOCUMENTS

| | | | |
|---|---|---|---|
| 1,066,788 | 7/1913 | Bowen | 99/413 X |
| 3,763,846 | 10/1973 | Schantz | 99/422 X |
| 4,445,428 | 5/1984 | Buford | 99/422 X |
| 4,542,685 | 9/1985 | Wilson | 99/413 |
| 5,359,924 | 11/1994 | Roberts et al. | 99/413 |
| 5,678,531 | 10/1997 | Byers et al. | 99/422 X |

*Primary Examiner*—Reginald L. Alexander
*Attorney, Agent, or Firm*—Covington & Burling

[57] ABSTRACT

This invention provides an open fryer griddle for use with deep fat fryers and other immersion-type hot liquid cooking equipment. Among other advantages, this open fryer griddle is portable, inexpensive to manufacture, and efficient. In a preferred embodiment, the open fryer griddle includes a griddle plate for cooking foods, and means for positioning the griddle plate in relation to the deep fat fryer. The griddle plate has a top surface and a rim. The open fryer griddle is positioned so that the top surface of the griddle plate is below the surface of liquefied fat in the fryer and the upper portion of the rim of the griddle plate is above the surface of the liquid. As a result, heat from the liquid fat is conducted directly to the open fryer griddle and also heats the air directly above the griddle surface, thereby permitting more efficient cooking.

12 Claims, 2 Drawing Sheets

OPEN FRYER GRIDDLE

BACKGROUND OF THE INVENTION

This invention relates to a cooking griddle, and more particularly to a portable cooking griddle heated by immersion-type hot liquid cooking equipment such as a deep fat fryer.

DESCRIPTION OF THE RELEVANT ART

Some restaurants are equipped with immersion-type hot liquid cooking equipment, such as deep fat fryers, but are not equipped with self-contained general purpose griddles. Certain foods, such as bacon, some egg dishes, and pancakes, generally cannot be prepared with hot liquid cooking equipment. The addition of a general purpose griddle to the restaurant would permit these foods to be prepared. General purpose griddles, however, take up considerable space and are expensive. Food items requiring a griddle for preparation may make up only a small portion of a restaurant's menu or may only be served during certain meal times such as breakfast. Especially under these circumstances, the purchase of a general purpose griddle may not be cost-effective.

An inexpensive portable griddle that uses existing restaurant equipment could, however, provide a cost-effective alternative to a general purpose griddle. A portable griddle could be conveniently stored when not in use and may not involve the large capital expense of a self-contained general purpose griddle. A number of portable griddles, which typically use a restaurant's existing deep fat fryer as a heat source, have been proposed.

One such portable griddle involves placing a griddle plate on top of a deep fat fryer and using radiated heat from the liquefied fat in the deep fat fryer to heat the griddle plate. To achieve such heating, the fat must typically be kept at higher-than-normal temperatures while the griddle is in use to ensure that sufficient heat is radiated to the griddle plate. The use of higher-than-normal operating temperatures, however, may cause the fat to degrade, may cause the cooked food to acquire undesirable tastes and smells, and increases energy consumption.

Another portable griddle involves floating a griddle plate on the surface of the liquefied fat in a deep fat fryer. The floating griddle plate will not, however, remain flat due to turbulence in the liquefied fat. Further, because the floating griddle plate displaces at least some of the liquefied fat, the surface of the liquefied fat must be kept well below the top of the deep fat fryer to prevent liquefied fat from overflowing the deep fat fryer when the floating griddle plate is in use. Thus, the user of the floating griddle plate is forced to reach into the hot deep fat fryer and work in close proximity to the hot liquefied fat to manipulate food on the inherently unstable floating griddle plate.

U.S. Pat. No. 4,445,428, entitled "Cooking Grill Heated from Deep Fat Fryer" and issued May 1, 1984 to Buford, attempted to avoid these difficulties with the radiated heat griddle plate and the floating griddle plate. Buford teaches the use of a complicated heat pipe system or other heat conducting structure in conjunction with a griddle plate placed on top of a deep fat fryer. The heat conducting structure in Buford is used to conduct heat directly from the liquefied fat in the deep fat fryer to the griddle plate.

All of the portable griddles described above cook food by transferring heat from the liquefied fat in a deep fat fryer to the surface of a griddle plate. More efficient cooking can be achieved, however, by taking full advantage of the heated liquid fat to heat the air above the griddle plate as well as the griddle plate itself. Further, there remains a need to produce a griddle, for use in conjunction with hot liquid cooking equipment, that is stable and efficient and can be manufactured inexpensively.

SUMMARY OF THE INVENTION

An object of the invention is to provide a low cost open fryer griddle that is portable and can be used with immersion-type heated liquid cooking equipment typically found in fast food restaurants.

A further object of the invention is to make efficient use of heat generated by immersion-type heated liquid cooking equipment by providing an open fryer griddle that cooks through the creation of an oven effect as well as by heat conduction.

A further object of the invention is to provide means for attaching an open fryer griddle to immersion-type heated liquid cooking equipment.

A further object of the invention is to provide an open fryer griddle with means for collecting liquids produced by cooking.

A further object of the invention is to provide an open fryer griddle with means for storing food and maintaining food temperature.

The present invention, as broadly described herein, provides an open fryer griddle comprising a griddle plate and means for positioning the griddle plate. The griddle plate has a top surface and a rim, and the rim has an upper portion. The positioning means, which is connected to the griddle plate, positions the griddle plate in a liquid such that the upper portion of the rim of the griddle plate is above the surface of the liquid and the top surface of the griddle plate is below the surface of the liquid. In a preferred embodiment, the positioning means includes a continuous extension of the rim.

In a preferred embodiment of the present invention, the positioning means further comprises means for attaching the griddle plate to heated liquid cooking equipment, such as a deep fat fryer. In a preferred embodiment, the attaching means includes a flange formed from a continuous extension of the rim of the griddle plate.

In a preferred embodiment of the present invention, the griddle plate further comprises means for storing liquids produced by cooking. In a preferred embodiment, the liquid storing means includes a recess in the griddle plate formed by stamping, bending or otherwise shaping the griddle plate.

In a preferred embodiment of the present invention, the positioning means further comprises means for storing food. In a preferred embodiment, the rim is formed from a heat-conductive material and the food storing means includes a tray formed from a continuous extension of the rim.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Figure 1:
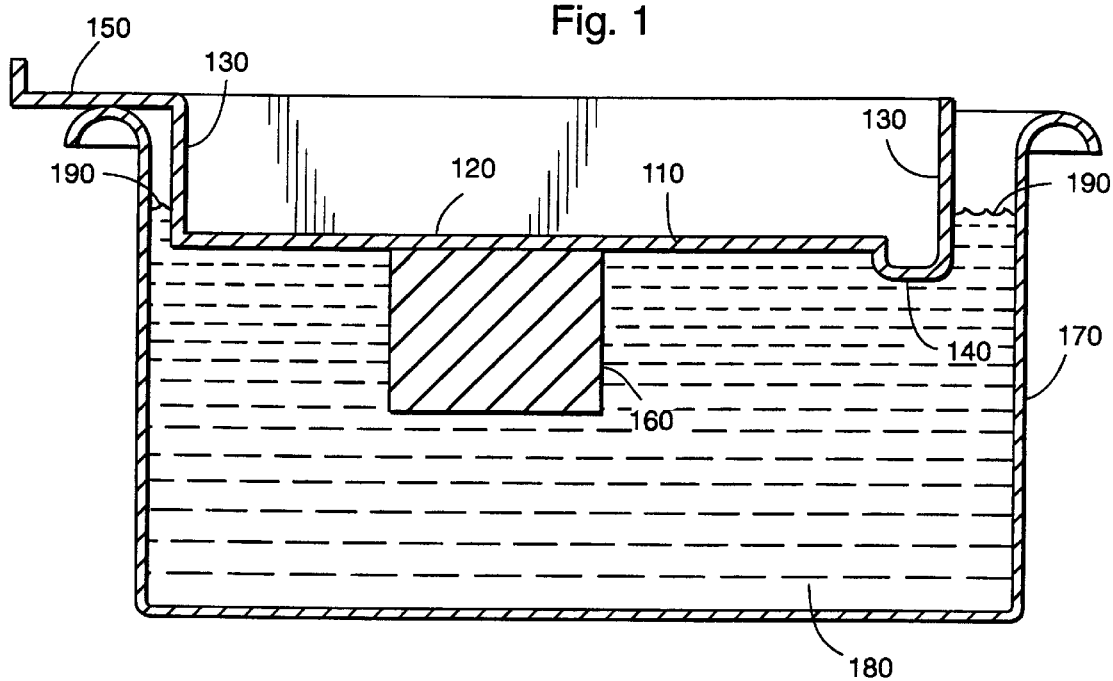
FIG. 1 is a cross-sectional view depicting a preferred embodiment of an open fryer griddle of the present invention, with the griddle positioned on an immersion-type hot liquid cooking apparatus such as a deep fat fryer. The cross-sectional view is taken through the center of the griddle from front to back.

Reference will now be made in detail to the present preferred embodiments of the invention, examples of which are illustrated in the accompanying drawings, wherein like reference numerals indicate like elements throughout the several views.

Figure 2:
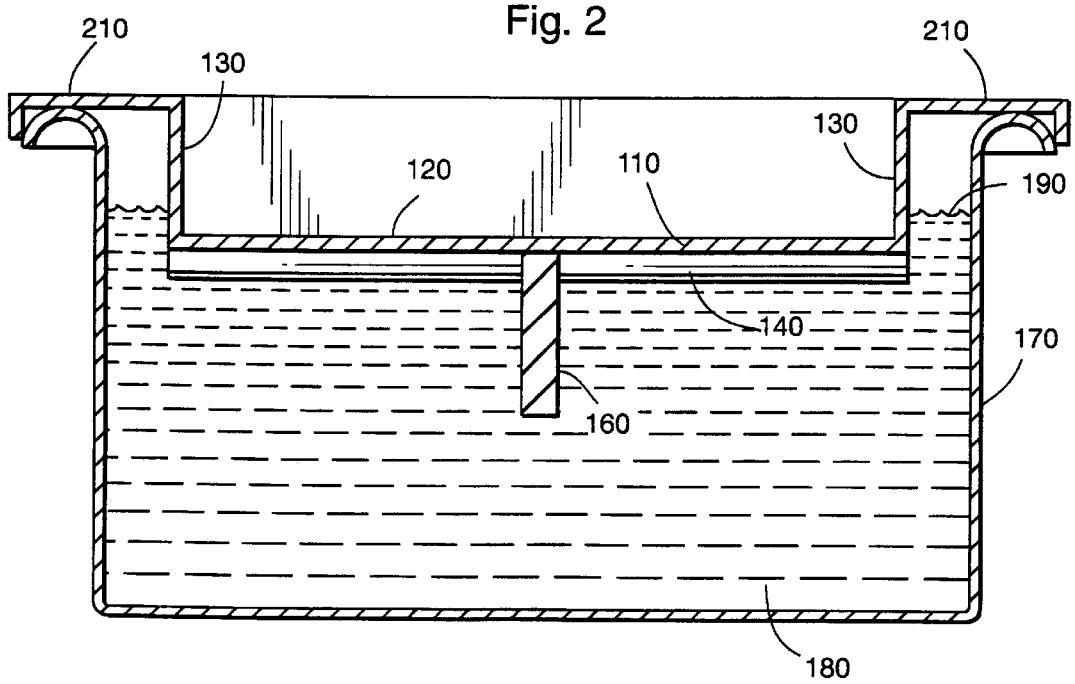
FIG. 2 is a cross-sectional view depicting a preferred embodiment of an open fryer griddle of the present invention, with the griddle positioned on an immersion-type hot liquid cooking apparatus such as a deep fat fryer. The cross-sectional view is taken through the center of the griddle from side to side.
Figure 3:
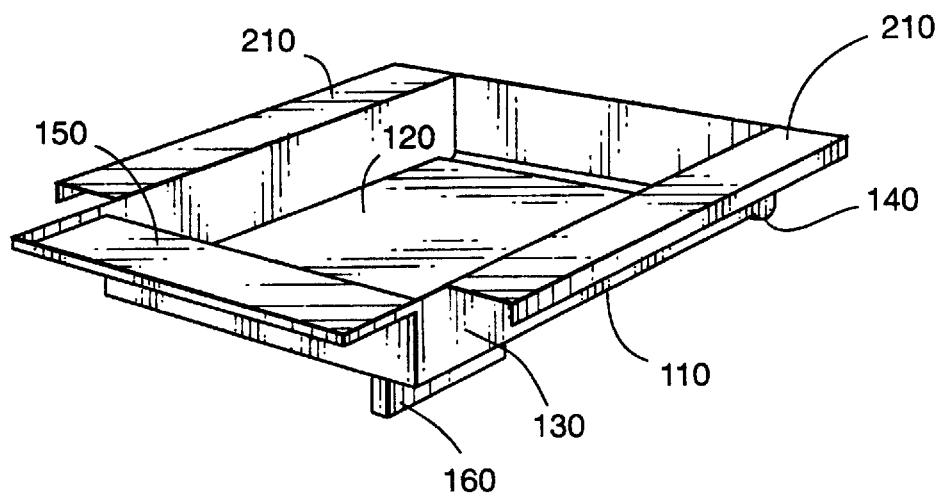
FIG. 3 is a perspective drawing of a preferred embodiment of an open fryer griddle of the present invention.

FIGS. 1 and 2 depict various cross-sectional views, and FIG. 3 depicts a perspective view, of a preferred embodiment of an open fryer griddle that includes griddle plate 110 and means for positioning griddle plate 110 in a liquid. For purposes of illustrating a use of the invention, and without limitation, a preferred embodiment of an open fryer griddle is depicted in FIGS. 1 and 2 as resting on container 170 and partially submerged below surface 190 of liquid 180. Container 170 may be a deep fat fryer and liquid 180 may be liquefied cooking fat. In the preferred embodiment depicted in FIGS. 1 and 2, griddle plate 110 has top surface 120, which is typically used for cooking food, and rim 130. In a preferred embodiment, griddle plate 110 is positioned so that top surface 120 is below surface 190 of liquid 180. The upper portion of rim 130, however, remains above surface 190 and thus prevents liquid 180 from flowing onto top surface 120.

In the preferred embodiment depicted in FIGS. 1 and 2, rim 130 is sufficiently high to prevent turbulence in liquid 180 from causing liquid 180 to overflow rim 130 and flood top surface 120 of griddle plate 110. As is known in the art, the calculation of a sufficient height for the upper portion of rim 130 may be based on the viscosity of liquid 180, the expected force transmitted to liquid 180 due to bumping by personnel using the invention, the effects of dropping food and other small objects into liquid 180, and other factors.

In a preferred embodiment, the positioning means includes means for attaching the griddle plate to a deep fat fryer. In alternative preferred embodiments, the positioning means includes means for attaching the griddle plate to other containers. In the preferred embodiment depicted in FIGS. 2 and 3, the attaching means comprises flanges 210. In the preferred embodiment depicted in FIGS. 1 and 2, the weight of griddle plate 110 is sufficient to ensure that griddle plate 110 does not float on liquid 190, but rather rests securely on container 170 with liquid 190 forced to a level above top surface 120 of griddle plate 110. Other means of attachment, such as bolts, friction devices, and clamps may also be used to attach a griddle plate to a container, as is known in the art.

In a preferred embodiment, the positioning means includes a continuous extension of the rim. In a preferred embodiment, the attaching means includes a continuous extension of the rim. In the preferred embodiment depicted in FIGS. 2 and 3, the positioning means includes rim 130 and flanges 210. As described above, flanges 210 also serve as attaching means. In a preferred embodiment, flanges 210 are continuous extensions of rim 130 and may be beneficially manufactured by bending, stamping, or other shaping operations, as are known in the art, whereby rim 130 and flanges 210 are formed from the same single sheet of material.

In a preferred embodiment, the positioning means includes means for storing food. In FIGS. 1 and 3, the food storing means includes tray 150. In preferred embodiments, such as the preferred embodiment depicted in FIGS. 1 and 3, a tray is formed by a continuous extension of the rim. A tray formed by a continuous extension of the rim may be manufactured by bending, stamping, or other shaping operations on the rim material, as is known in the art. Preferred embodiments, such as that depicted in FIGS. 1 and 3, in which a rim is formed from a heat-conducting material, and a tray is formed by a continuous extension of the rim, provide the additional advantage of warming items placed on the tray from heat conducted from a liquid. In alternative preferred embodiments, other means for storing food or other forms of trays may be employed, as are known in the art.

As mentioned above, a preferred embodiment of the invention is depicted in use with a deep fat fryer in FIGS. 1 and 2. The invention may also be used with other cooking devices, as are known in the art, that employ heated liquids. In typical operation, heat from a heated liquid is conducted through the griddle plate of a preferred embodiment of the invention thus providing a heated surface suitable for cooking. Most significantly, however, in the preferred embodiment depicted in FIGS. 1 and 2, in the present invention the top surface 120 of the griddle plate is below the surface of the heated liquid resulting in the conduction of substantial amounts of heat through the rim 130 of the griddle plate 110, thereby heating the air directly above the griddle plate surface 120. Food may therefore be cooked more efficiently through the combination of the frying effect of the heated griddle plate 110 and the oven-like effect of the heated air directly above the surface 130 of griddle plate 110.

In the preferred embodiment depicted in FIGS. 1, 2, and 3, the open fryer griddle includes fin 160. In the preferred embodiment depicted in FIGS. 1 and 2, fin 160 is attached to griddle plate 110 and projects into liquid 180. Fin 160 facilitates the transfer of heat from liquid 180 to griddle plate 110. In alternative preferred embodiments, more than one fin may be attached to a griddle plate. In a preferred embodiment, a fin extends the entire length of the underside of the griddle plate, from front to back. As is known in the art, fins may be attached to a griddle plate by welding, bolting, gluing, or other means. In a preferred embodiment, the griddle plate and fin are molded as one piece. In further alternative embodiments, means, as are known in the art, such as heat pipes and other heat conductive structures, may be used to facilitate a transfer of heat from a liquid to a griddle plate.

In the preferred embodiment of an open fryer griddle depicted in FIGS. 1, 2, and 3, griddle plate 110 includes means for storing liquids produced by foods that are being cooked on griddle plate 110. In FIGS. 1, 2, and 3, the liquid storing means includes recess 140. In preferred embodiments, a recess for storing liquids may be manufactured by bending, stamping or otherwise shaping, as is known in the art, a portion of a griddle plate. In alternative embodiments, other means for storing liquids, as are known in the art, may be employed.

It will be apparent to those skilled in the art that various modifications can be made to this invention of an open fryer griddle, without departing from the scope or spirit of the invention. It is also intended that the present invention and the appended claims cover modifications, variations and equivalents of the open fryer griddle of the present invention.

We claim:

1. An open fryer griddle, comprising:

a griddle plate having a top surface and a rim, the rim having an upper portion; and means, connected to the griddle plate, for positioning the griddle plate in a liquid wherein the upper portion of the rim of the griddle plate extends above the surface of the liquid and the top surface of the griddle plate is below the surface of the liquid, the rim and griddle plate forming an imperforate barrier to the liquid.

2. The open fryer griddle of claim 1, wherein the height of the upper portion of the rim substantially prevents the liquid from flowing onto the top surface of the griddle plate.

3. The open fryer griddle of claim 1, wherein the positioning means comprises means for attaching the griddle plate to a container containing the liquid.

4. The open fryer griddle of claim 3, wherein the attaching means comprises a flange.

5. The open fryer griddle of claim 3, wherein the attaching means comprises a continuous extension of the rim.

6. The open fryer griddle of claim 1, wherein the positioning means comprises a continuous extension of the rim.

7. The open fryer griddle of claim 1, further comprising a fin attached to the griddle plate and projecting into the liquid.

8. The open fryer griddle of claim 1, wherein the griddle plate comprises means for storing liquids.

9. The open fryer griddle of claim 8, wherein the liquid storing means comprises a recess in the griddle plate.

10. The open fryer griddle of claim 1, wherein the positioning means comprises means for storing food.

11. The open fryer griddle of claim 10, wherein the food storing means comprises a tray.

12. The open fryer griddle of claims 10 or 11, wherein the food storing means comprises a continuous extension of the rim.

* * * * *